United States Patent
Matsubayashi et al.

(10) Patent No.: US 9,431,883 B2
(45) Date of Patent: Aug. 30, 2016

(54) METHOD OF MANUFACTURING LAMINATED CORE HAVING PERMANENT MAGNETS SEALED WITH RESIN

(75) Inventors: Satoshi Matsubayashi, Kitakyushu (JP); Akira Nagai, Kitakyushu (JP); Go Kato, Kitakyushu (JP)

(73) Assignee: MITSUI HIGH-TEC, INC., Kitakyushu-shi (JP)

( * ) Notice: Subject to any disclaimer, the term of this patent is extended or adjusted under 35 U.S.C. 154(b) by 233 days.

(21) Appl. No.: 14/123,869

(22) PCT Filed: May 7, 2012

(86) PCT No.: PCT/JP2012/061683
§ 371 (c)(1),
(2), (4) Date: Dec. 4, 2013

(87) PCT Pub. No.: WO2013/001912
PCT Pub. Date: Jan. 3, 2013

(65) Prior Publication Data
US 2014/0109391 A1    Apr. 24, 2014

(30) Foreign Application Priority Data

Jun. 30, 2011 (JP) ................................. 2011-146264
Aug. 30, 2011 (JP) ................................. 2011-187678

(51) Int. Cl.
H02K 15/02    (2006.01)
H02K 15/00    (2006.01)
(Continued)

(52) U.S. Cl.
CPC .......... *H02K 15/0025* (2013.01); *H02K 15/03* (2013.01); *H02K 1/276* (2013.01); *Y10T 29/49009* (2015.01)

(58) Field of Classification Search
CPC ...... H02K 15/00; H02K 15/02; H02K 15/03; H02K 1/276; H02K 15/0025; Y10T 29/49009
See application file for complete search history.

(56) References Cited

U.S. PATENT DOCUMENTS

| 3,979,821 A | 9/1976 | Noodleman |
| 4,011,120 A | 3/1977 | Aggen |

(Continued)

FOREIGN PATENT DOCUMENTS

| CN | 101356711 A | 1/2009 |
| JP | 58-046857 A | 3/1983 |

(Continued)

OTHER PUBLICATIONS

Notification of Reasons for Refusal dated Jul. 9, 2014, issued in corresponding Chinese Patent Application No. 201180024896.1, w/English translation. (6 pages).

(Continued)

*Primary Examiner* — Carl Arbes
(74) *Attorney, Agent, or Firm* — Westerman, Hattori, Daniels & Adrian, LLP

(57) ABSTRACT

A method of manufacturing a laminated core, having a laminated core body 10a formed by laminating plural core sheets 11 and having magnet insertion holes 13, 14 with openings 17, 18 opening to a inner space 15 or an external side, inserting and resin-sealing permanent magnets 20, 21 in the magnet insertion holes 13, 14, with the openings 17, 18 blocked by a blocking member 23, the method including: temporarily connecting blocking member pieces 32 to be the blocking member 23 in each of the core sheets 11 and removing the blocking member 23 with the laminated core body 10a resin-sealed. By this, without a special blocking member, the permanent magnets 20, 21 are resin-sealed while the magnet insertion holes 13, 14, parts of which have the openings 17, 18, are blocked.

14 Claims, 11 Drawing Sheets

(51) Int. Cl.
*H02K 15/03* (2006.01)
*H02K 1/27* (2006.01)

(56) References Cited

U.S. PATENT DOCUMENTS

| | | |
|---|---|---|
| 2008/0252166 A1 | 10/2008 | Shiga et al. |
| 2009/0045689 A1 | 2/2009 | Haruno et al. |
| 2009/0174273 A1 | 7/2009 | Watanabe et al. |
| 2009/0189309 A1* | 7/2009 | Matsubayashi ........ H02K 15/12 264/263 |
| 2012/0139378 A1 | 6/2012 | Endo |
| 2014/0109391 A1 | 4/2014 | Matsubayashi et al. |

FOREIGN PATENT DOCUMENTS

| | | |
|---|---|---|
| JP | 06-165447 A | 6/1994 |
| JP | 02-34187 A | 1/2002 |
| JP | 2002-027712 A | 1/2002 |
| JP | 2002-325402 A | 11/2002 |
| JP | 2004-023976 A | 1/2004 |
| JP | 2006-197693 A | 7/2006 |
| JP | 2007-068356 A | 3/2007 |
| JP | 2008-011646 A | 1/2008 |
| JP | 2009-131075 A | 6/2009 |
| JP | 2010-158164 A | 7/2010 |
| JP | 2010-206882 A | 9/2010 |
| JP | 2012-044810 A | 3/2012 |
| WO | 2007/080661 A1 | 7/2007 |
| WO | 2011077513 A1 | 6/2011 |

OTHER PUBLICATIONS

Notification of Reason for Refusal dated Sep. 2, 2014, issued in corresponding Japanese Patent Application No. 2013-218437, w/English translation. (3 pages).
International Search Report of PCT/JP2011/064460, mailing date Sep. 13, 2011.
Decision of Patent Grant dated Dec. 2, 2014, issued in corresponding Japanese Patent Application No. 2013-218437, with English translation (4 pages).
First Notice of Reasons for Refusal dated Jul. 15, 2015, issued in counterpart Chinese Application No. 201280028433.7, with English translation. (15 pages).
International Search Report, dated Aug. 7, 2012, issued in corresponding application No. PCT/JP2012/061683.
Final Office Action dated Nov. 2, 2015, issued in U.S. Appl. No. 13/813,483 (20 pages).
Non-Final Office Action dated Feb. 18, 2015, issued in U.S. Appl. No. 13/813,483 (17 pages).
Non-Final Office Action dated May 19, 2016, issued in U.S. Appl. No. 13/813,483. (16 pages).

* cited by examiner

METHOD OF MANUFACTURING LAMINATED CORE HAVING PERMANENT MAGNETS SEALED WITH RESIN

TECHNICAL FIELD

The present invention relates to a method of manufacturing a laminated core (i.e., a rotor or a stator) including fixing permanent magnets (including unmagnetized permanent magnets) with resin in a laminated core body formed by laminating core sheets (the method is referred to as a "magnet-molding method").

BACKGROUND ART

Conventionally, as a method of resin-sealing and fixing permanent magnets in a laminated core body, a method disclosed in Patent Literature 1 is known. The method of Patent Literature 1 includes forming a plurality of magnet insertion holes in a radially outward region of a laminated core body of a rotor, inserting permanent magnets in the magnet insertion holes, holding the laminated core body between an upper die and a lower die, and pouring resin into the magnet insertion holes from resin pots provided in the upper die and thereby fixing the permanent magnets.

In addition, the magnet insertion hole of Patent Literature 1 has a rectangular shape in plain view and a circumference of the magnet insertion hole is hermetically closed, which prevents the resin from leaking laterally. However, the permanent magnet placed in such a closed space having a rectangular cross-section increases leakage of magnetic flux generated by the permanent magnet, and thus a part of the magnet insertion hole is opened to decrease the leakage of magnetic flux of the permanent magnet. Like this, in a case where the resin is poured into the magnet insertion hole having a part opening laterally (i.e., an opening), an appropriate blocking member is placed in the opening to make the magnet insertion hole an closed space in plain view and thereafter the magnet insertion hole is resin-sealed.

CITATION LIST

Patent Literature

Patent Literature 1: Japanese Unexamined Patent Application Publication No. 2010-158164

SUMMARY OF INVENTION

Technical Problem

However, the above-described technique requires the blocking member separately prepared. Even if the blocking member can be used repeatedly, the blocking member has to be cleaned after being removed from the resin-sealed laminated core, resulting in a time-consuming operation.

The present invention has been made in view of the above circumstances, and it is an object of the present invention to provide a method of manufacturing a laminated core, in which permanent magnets are resin-sealed in magnet insertion holes while the magnet insertion holes, a part of each having an opening, are closed without any special blocking members.

Solution to Problem

To accomplish the above object, a first aspect of the present invention provides a method of manufacturing a laminated core, the laminated core including a laminated core body formed by laminating a plurality of core sheets, the laminated core body having magnet insertion holes with openings opening to a inner space or an external side, inserting permanent magnets in the magnet insertion holes, and resin-sealing the permanent magnets in the magnet insertion holes with the openings blocked by a blocking member, the method comprising: forming a blocking member piece to be the blocking member in each of the core sheets; resin-sealing the permanent magnets in the magnet insertion holes of the laminated core body of the assembled core sheets; and thereafter removing the blocking member.

A second aspect of the present invention provides the method of manufacturing a laminated core according to the first aspect, wherein a part or an entire part of circumference of the blocking member piece is frictionally held by the core sheet located around the blocking member piece.

A third aspect of the present invention provides the method of manufacturing a laminated core according to the first aspect, wherein a part of circumference of the blocking member piece is connected to the core sheet located around the blocking member piece by a V-notched groove.

A fourth aspect of the present invention provides the method of manufacturing a laminated core according to the first to third aspects, wherein a part of circumference of the blocking member piece includes an engagement projection, and the core sheet located around the blocking member piece includes an engagement recess, into which the engagement projection is fitted.

A fifth aspect of the present invention provides the method of manufacturing a laminated core according to the first aspect, wherein the blocking member pieces blocking the openings include stopper pieces each connected to the opening or the core sheet located around the opening in a way that the stopper piece is cut and bent, and the blocking member piece other than the stopper piece connected to the core sheet is connected to the core sheet by a shrunk neck portion or a V-shaped notch.

A sixth aspect of the present invention provides the method of manufacturing a laminated core according to the fifth aspect, wherein the blocking member piece includes an elastic portion enabling the stopper piece to elastically move backward from the opening.

A seventh aspect of the present invention provides the method of manufacturing a laminated core according to the sixth aspect, wherein the elastic portion is bent in a zigzag shape or an arc shape in plain view.

An eighth aspect of the present invention provides the method of manufacturing a laminated core according to the first aspect, wherein the openings include inward engagement pieces inwardly facing to each other, the blocking member piece includes the stopper pieces having outward engagement pieces to be fitted in the inward engagement pieces, and the blocking member piece is frictionally engaged with the core sheet by a punching operation and a push-back operation performed in sequence.

A ninth aspect of the present invention provides the method of manufacturing a laminated core according to the eighth aspect, wherein the inward engagement piece and the outward engagement piece each have a triangle shape in plain view.

A tenth aspect of the present invention provides the method of manufacturing a laminated core according to the first aspect, wherein the blocking member pieces are formed in the core sheets by a half-punching operation, and the vertically-aligned core sheets are connected by the half-punched blocking member pieces.

An eleventh aspect of the present invention provides the method of manufacturing a laminated core according to the first aspect, wherein the blocking member piece includes abutment portions being in contact with the core sheet located in both sides of the openings and connecting portions to be partly connected to the core sheet with V-shaped notches, by half-punching, or with constrictions.

A twelfth aspect of the present invention provides the method of manufacturing a laminated core according to the first to eleventh aspects, wherein the magnet insertion holes are arranged in pairs, and each pair of the magnet insertion holes includes the openings facing to each other.

A thirteenth aspect of the present invention provides the method of manufacturing a laminated core according to the first to twelfth aspects, wherein the blocking member pieces include interlocking portions and thereby the vertically-aligned blocking member pieces are laminated and interlocked.

A fourteenth aspect of the present invention provides the method of manufacturing a laminated core according to the first to thirteenth aspects, wherein, after the permanent magnets are resin-sealed in the magnet insertion holes, the laminated blocking member pieces are punched and removed by a punch or are pressed, pushed, and removed by a pin member.

Advantageous Effects of Invention

Since the method of manufacturing a laminated core according to the present invention is structured as described above, it is not necessary to prepare a conventional high-accuracy blocking member for blocking the openings of the magnet insertion holes. Also, in the present invention, a part of the material for the core sheet is used for forming the blocking member, and thus the blocking member is disposable and further is freely chosen depending on the shape of the laminated core.

DESCRIPTION OF EMBODIMENTS

Referring to the accompanying drawings, embodiments of the present invention will be described. First, a description will be given on a laminated core 10 manufactured by a method of manufacturing a laminated core according to a first embodiment of the present invention, referring to FIGS. 1(A) and 1(B).

Figure 1A:
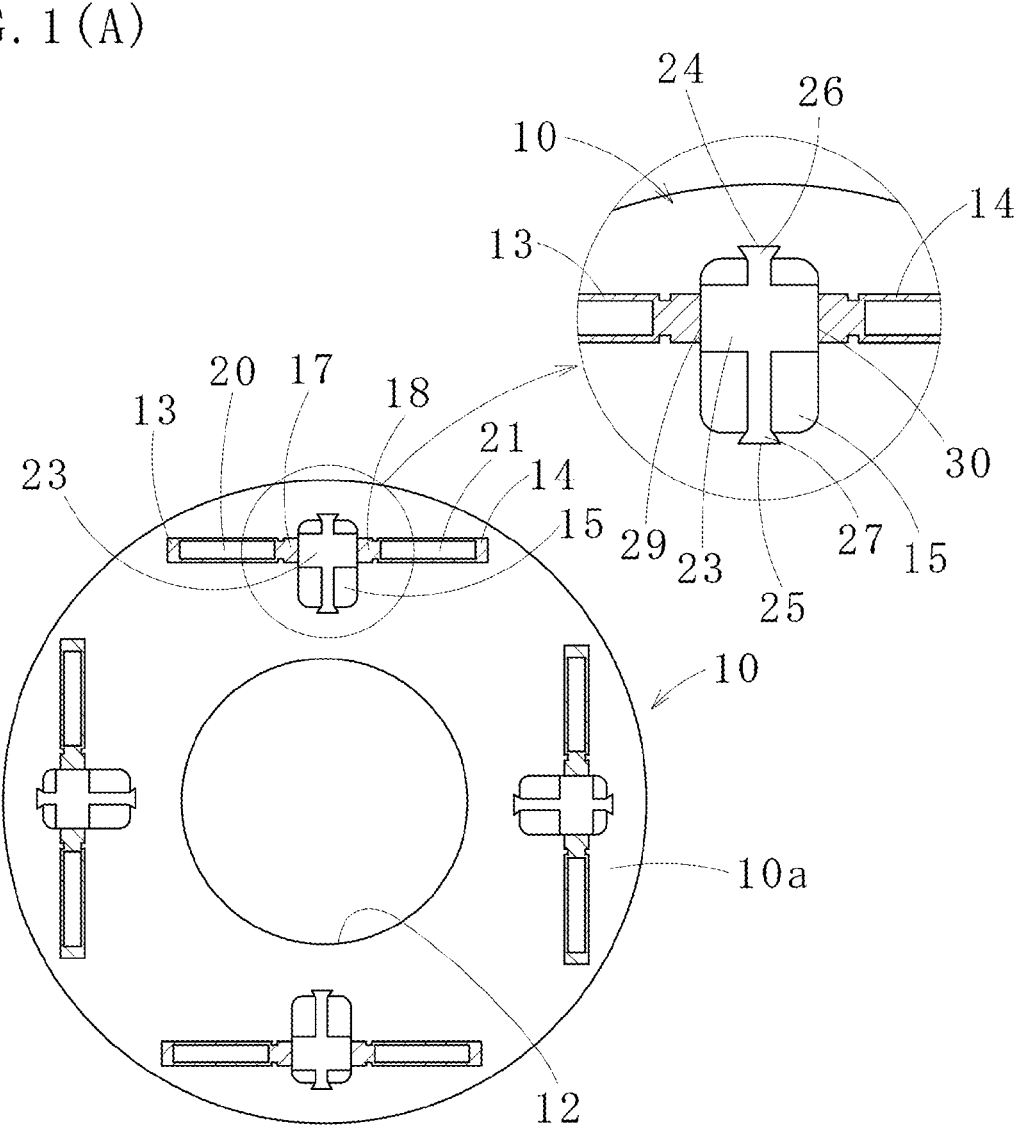
FIG. 1(A) is a plain view of a laminated core, manufactured by a method of manufacturing a laminated core according to a first embodiment of the present invention.
Figure 1B:
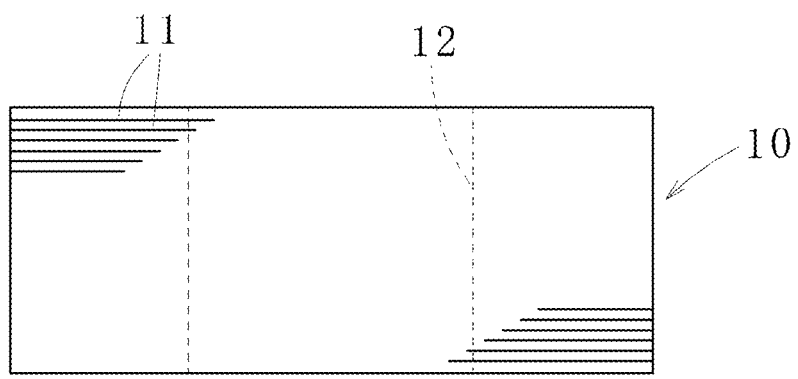
FIG. 1(B) is a front view of the same.

As shown in FIGS. 1(A) and 1(B), the laminated core 10 is used for a rotor, and a laminated core body 10a made by laminating and interlocking a plurality of annular core sheets 11 includes a shaft hole 12 in a center thereof and a plurality of (four in this embodiment) paired magnet insertion holes 13, 14 in a radially outward region thereof. Each pair of magnet insertion holes 13, 14 includes an inner space 15 therebetween. The inner space 15 is communicated with the magnet insertion holes 13, 14 via openings 17, 18 provided in the magnet insertion holes 13, 14 (the same as embodiments below). Here, the laminated core body 10a is referred to as a body formed by laminating and interlocking core sheets 11, in which permanent magnets 20, 21 are not resin-sealed in the magnet insertion holes 13, 14. In addition, between the magnet insertion holes 13, 14 and the openings 17, 18, stoppers (inward projections) to prevent the permanent magnets 20, 21 from moving sideways are provided. The stoppers are omissible when the permanent magnets 20, 21 fit in predetermined positions.

The inner space 15 is used to lighten a weight of a rotor (i.e., the laminated core 10). Further, the inner space 15 is communicated with the magnet insertion holes 13, 14 to improve magnetic characteristics of the permanent magnets 20, 21 buried in the magnet insertion holes 13, 14 to the rotor. In an intermediate step of manufacturing of the laminated core 10, the inner space 15 has a blocking member 23, which can be removed in the end. The blocking member 23 blocks the facing openings 17, 18. The blocking member 23 includes projecting portions 27, 26 (an example of engagement projections) to be fitted into dovetail grooves 25, 24 (an example of engagement recesses) provided in radially inward and outward sides of the inner space 15 having an approximate rectangular shape in plain view. Also, lateral sides 29, 30 in a circumferential direction of the blocking member 23 completely block the openings 17, 18, preventing a leakage of resin.

Figure 2A:
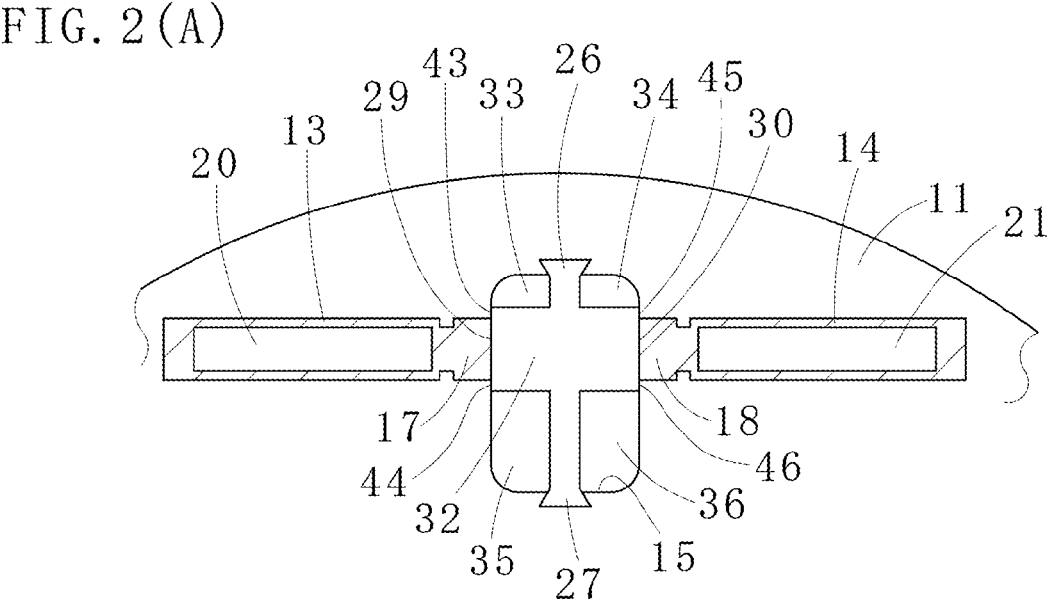
FIGS. 2(A) to 2(C) are partially-enlarged views of core sheets used for the laminated core, respectively.

Next, a description will be given on a method of manufacturing a laminated core according to the first embodiment of the present invention, which is used for manufacturing the laminated core 10. In the description below, since the core sheet 11 and the laminated core body 10a without permanent magnets 20, 21 in plain view have the same configuration, the same name and numeral are used therefor except when they are clearly stated. The core sheet 11 is formed by punching an unillustrated magnetic thin strip material having a predetermined width by a die device. Punching operations are performed in no particular order, for example, in the following order: 1) a formation of the central shaft hole 12; 2) a formation of the magnet insertion holes 13, 14 including the openings 17, 18; 3) a formation of through-holes 33-36 forming a blocking member piece 32 forming the blocking member 23 (see FIG. 2); 4) a formation of well-known interlocking members (not illustrated) for connecting the vertically-aligned core sheets 11; and thereafter 5) the blocking member piece 32 is temporarily connected to a part of the inner space 15 to prevent the blocking member piece 32 from being fallen from the inner space 15, an outline of the core sheet 11 is punched to drop the core sheet 11 off the thin strip material, and the core sheets 11 are laminated and interlocked inside the die.

A detail description is omitted for 1) the formation of the central shaft hole 12, 2) the formation of the magnet insertion holes 13, 14 including the openings 17, 18, 3) the formation of through-holes 33-36 forming the blocking member piece 32 forming the blocking member 23, because those are performed by a well-known method of blanking the thin strip material to form through-holes using a punch and a die.

Hereinafter, a detail description for the process of temporarily connecting the blocking member piece 32 to a part of the inner space 15 to prevent the blocking member piece 32 from being fallen from the inner space 15 including the dovetail grooves 24, 25.

(1) First method of temporarily connecting the blocking member piece 32 to the inner space 15

Figure 3A:
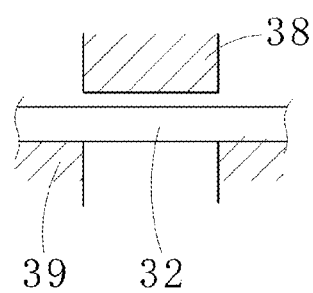
FIGS. 3(A) to 3(F) are explanatory diagrams showing how to temporarily connect a blocking member piece to the core sheet surrounding the blocking member piece.
Figure 3B:
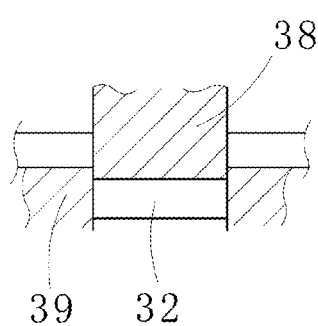
Figure 3C:
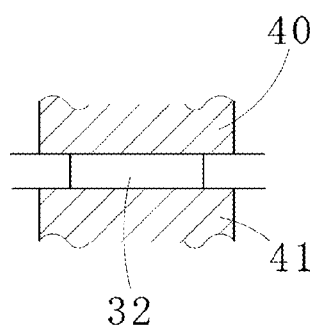

As shown in FIGS. 3(A) and 3(B), a punching operation is performed by using a punch 38 and a die 39 to separate the blocking member piece 32 including the projecting portions 26, 27 to be fitted in the dovetail grooves 24, 25 from the strip material (a half-punching operation is possible according to circumstances). Then, as shown in FIG. 3(C), the separated blocking member piece 32 is pressed by flat punches 40, 41 to be returned to its original position. By this, the blocking member piece 32 is connected to the inner space 15 in a way that the blocking member piece 32 is frictionally-held in the inner space 15, thus the blocking member piece 32 is held in the core sheet 11 as it is. Eventually, the blocking member pieces 32 are laminated to be the blocking member 23.

Figure 2B:
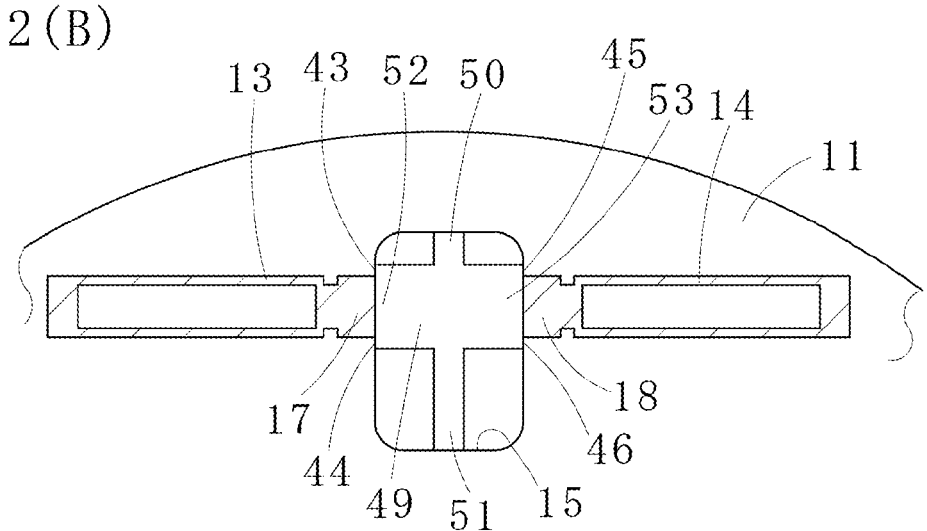
Figure 2C:
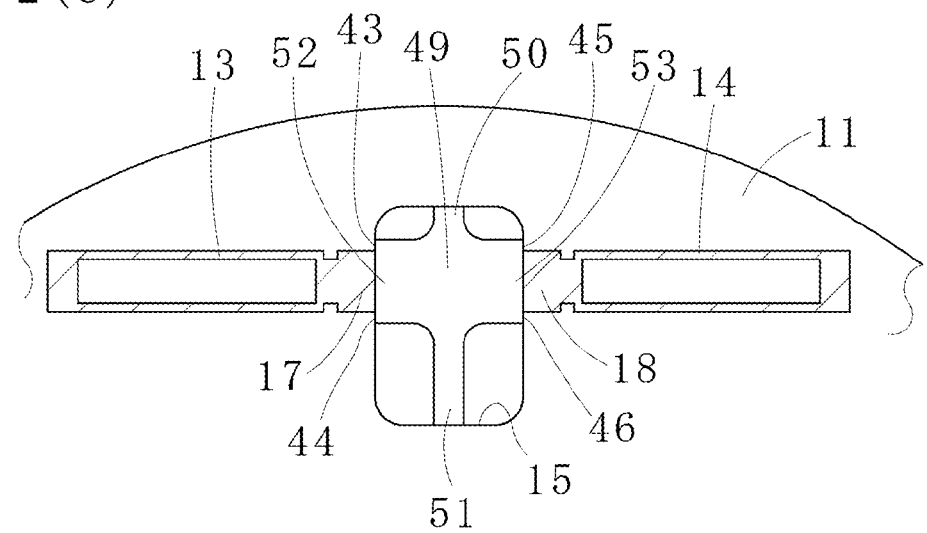

After that, the permanent magnets 20, 21 are inserted into the magnet insertion holes 13, 14 of the laminated core body 10a and then the laminated core body 10a is resin-sealed. At this stage, the openings 17, 18 are closed with the blocking member 23, so that the sealed resin does not leak. After the resin-sealing of the magnet insertion holes 13, 14 is completed, the blocking member 23 is pressed from a top or a bottom thereof by the punch, and the blocking member 23 is removed (punched and removed) from the inner space 15. The dovetail grooves 24, 25 hold the blocking member piece 32 in the inner space 15, preventing the blocking member piece 32 from moving. In this first method, the dovetail grooves 24, 25 are not essential elements. As shown in FIGS. 2(B) and 2(C), the dovetail grooves 24, 25 can be omitted.

(2) Second method of temporarily connecting the blocking member piece 32 to the inner space 15

Figure 3D:
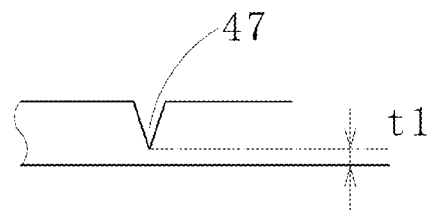

Ends of the projecting portions 26, 27 are put in the dovetail grooves 24, 25 and then these ends are completely separated. Then, V-shaped notches 47 (i.e., V-notched grooves) as shown in FIG. 3(D) are formed in joining sections 43-46, where the lateral sides 29, 30 in a circumferential direction of the blocking member piece 32 are connected to the core sheet 11 located in radially inward and outward sides of the openings 17, 18. The V-shaped notch 47 is formed by a V-shaped punch, and a plate thickness t1 is approximately 0.05-0.1 mm. Preferably, an angle of the V-shaped notch 47 is an acute angle, but can be 90 degrees in view of an abrasion or a wear of the V-shaped notch 47.

Figure 3E:
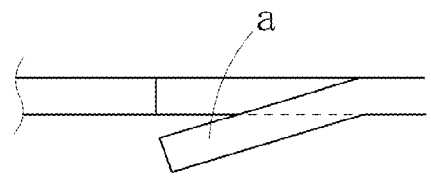
Figure 3F:
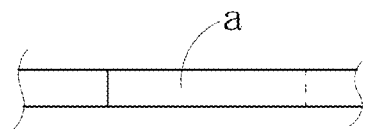

As a technique to cut off the ends of the projecting portions 26, 27 inside the dovetail grooves 24, 25, as shown in FIG. 3(E), one side of a plate material a (to be the projecting portions 26, 27) is bent and cut in a predetermined shape. As shown in FIG. 3(F), the plate material a is push back to its original position using the flat punches, or the plate material a is pressed to a flat die to be a planar state. By this, since the blocking member piece 32 is connected to the circumference of the inner space 15 and the joining sections 43-46 where the V-shaped notches 47 are formed, the laminated blocking member pieces 32 serve as the blocking member 23 and the blocking member 23 blocks the openings 17, 18, which allows a stable resin-sealing performance. After the resin-sealing process is completed, the blocking member 23 is punched and dropped off. Also in this example, the dovetail grooves 24, 25 are not essential elements and can be omitted as shown in FIGS. 2(B) and 2(C).

(3) Third method of temporarily connecting the blocking member piece 32 to the inner space 15

As shown in FIGS. 2(B) and 2(C), projecting portions 50-53 of a cross-shaped blocking member piece 49 are connected to the circumference of the inner space 15 by the V-shaped notches 47, which are shown in FIG. 3(D). By this, after the laminated core body 10a is resin-sealed, the blocking member 23 formed by laminating the blocking member pieces 49 is easily removed.

In the embodiment described hereinabove, interlocking members can be provided in the blocking member pieces 32 or 49 to laminate and interlock the vertically-aligned blocking member pieces 32 or 49. In this case, preferably, the V-shaped notches 47 are formed only in topmost and lowermost blocking member pieces 32 or 49 and the blocking member pieces 32 or 49 located therebetween are separated from surroundings, and the entire blocking member pieces 32 or 49 are laminated and interlocked. By this, the blocking member 23 is stably held in the inner space 15 and is easily removed. In addition, each width of the joining sections 43-46 where the V-shaped notches 47 are formed (see FIGS. 2(A), 2(B), and 2(C)) is within a range of 0.5-2 mm, and the narrower width allows an easier removal and prevents a deformation of the laminated core 10 due to thermal expansion of the blocking member pieces 32 or 49 at the resin-sealing of the permanent magnets 20, 21. Furthermore, by making the openings 17, 18 of the magnet insertion holes 13, 14 small, an amount of resin in contact with the blocking member 23 can be reduced and thus the blocking member 23 can be easily removed.

Now, referring to FIGS. 4 and 5, a method of manufacturing a laminated core according to a second embodiment of the present invention will be described.

Figure 4A:
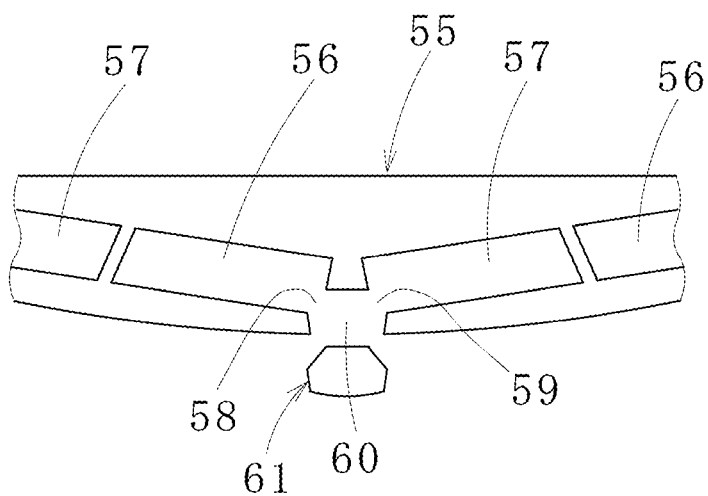
FIGS. 4(A) and 4(B) are explanatory diagrams of a method of manufacturing a laminated core according to a second embodiment of the present invention.
Figure 4B:
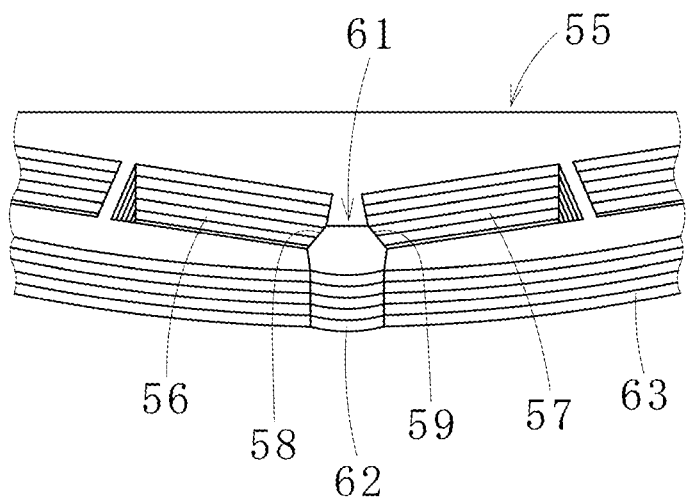
Figure 5:
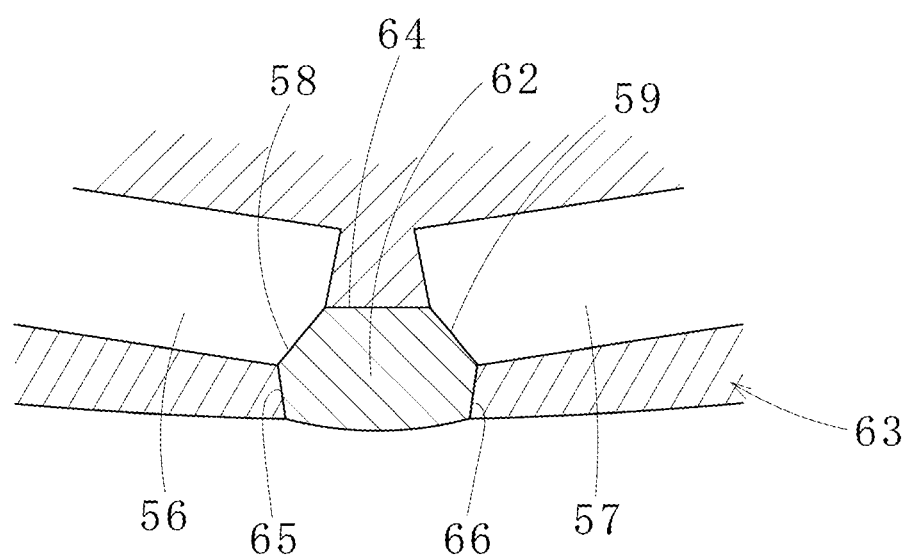
FIG. 5 is an explanatory diagram showing a partially-enlarged core sheet used for the method of manufacturing the laminated core.

FIGS. 4(A), 4(B), and 5 show a part of a laminated core body 55. An entire part of the laminated core body 55 is the same as one shown in FIGS. 1(A) and 1(B). The laminated core body 55 includes a shaft hole in a center thereof and pairs of magnet insertion holes 56, 57 around the shaft hole. In an end product, the magnet insertion holes 56, 57 communicate to an outer space 60, and the outer space 60 communicates to a radially outward side of the laminated core body 55 through openings 58, 59 (i.e., the magnet insertion holes 56, 57 open up to the outward side).

Before the magnet insertion holes 56, 57 with the permanent magnet inserted are sealed with resin, a blocking member 61 is placed in the outer space 60. The blocking member 61 is removed after the resin-sealing process is completed.

While blocking member pieces 62 forming the blocking member 61 are temporarily connected to core sheets 63 located therearound, the core sheets 63 are punched out along outlines thereof to be laminated inside the die. The blocking member pieces 62 are laminated to be the blocking member 61, blocking the openings 58, 59 of the magnet insertion holes 56, 57.

Areas where the blocking member piece 62 and the core sheet 63 are temporarily connected are three of a central connection 64 and lateral connections 65, 66, so that those three areas are temporarily connected. The following methods can be used for the temporal connection: 1) a method of forming the V-shaped notches 47 as shown in FIG. 3(D) in all of the central connection 64 and the lateral connections 65, 66; 2) a method of performing punching operations as shown in FIG. 3(A) to the entire blocking member pieces 62; 3) a method of cutting any one or two of the central connection 64 and the lateral connections 65, 66 by cutting and bending operations or pushing-back operations as shown in FIG. 3(E) and forming the V-shaped notches 47 in the rest of those sections; 4) a method of forming the V-shaped notches 47 only in the topmost and lowermost blocking member pieces 62 and laminating and interlocking the blocking member pieces 62; and 5) in additions to the methods 1) to 4), a method of forming engagement recesses such as dovetail grooves and a engagement projections.

Now, referring to FIGS. 6 and 7, a description will be given on essential parts of a method of manufacturing a laminated core according to a third embodiment of the present invention.

Figure 6:
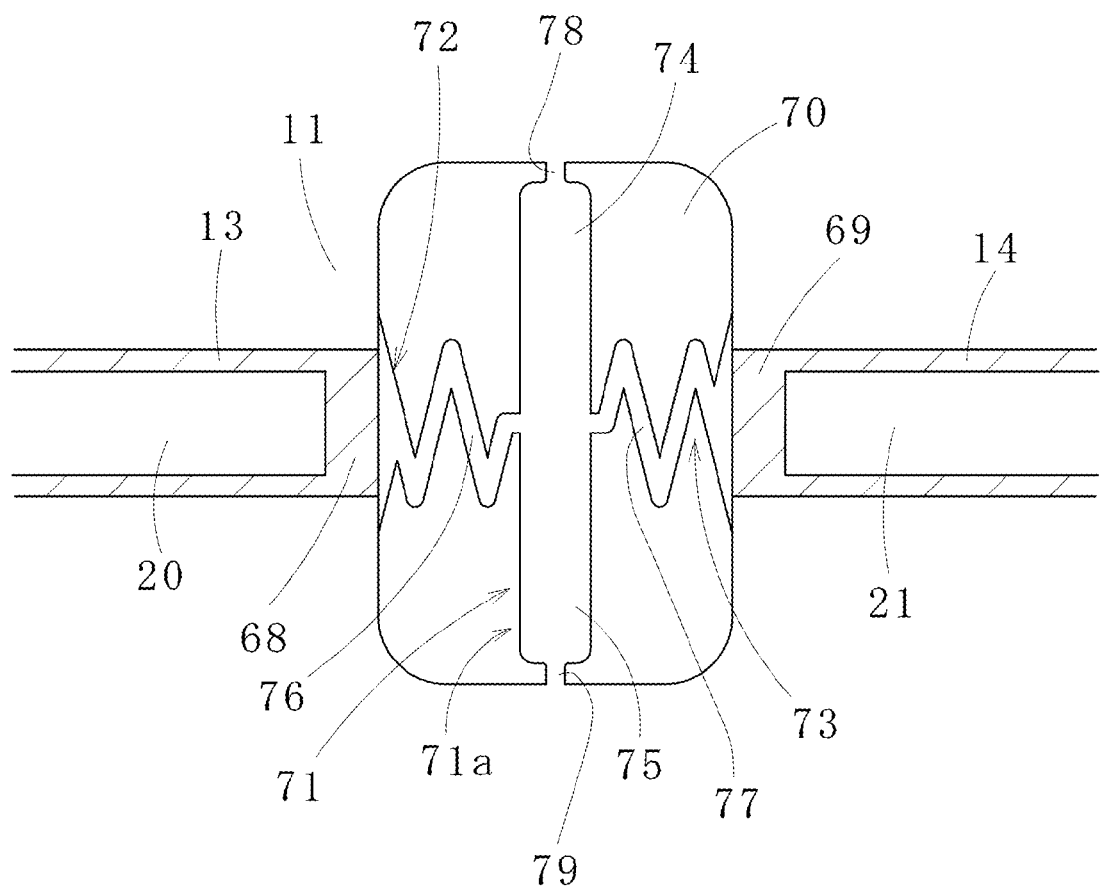
FIG. 6 is an explanatory diagram of a method of manufacturing a laminated core according to a third embodiment of the present invention.
Figure 7:
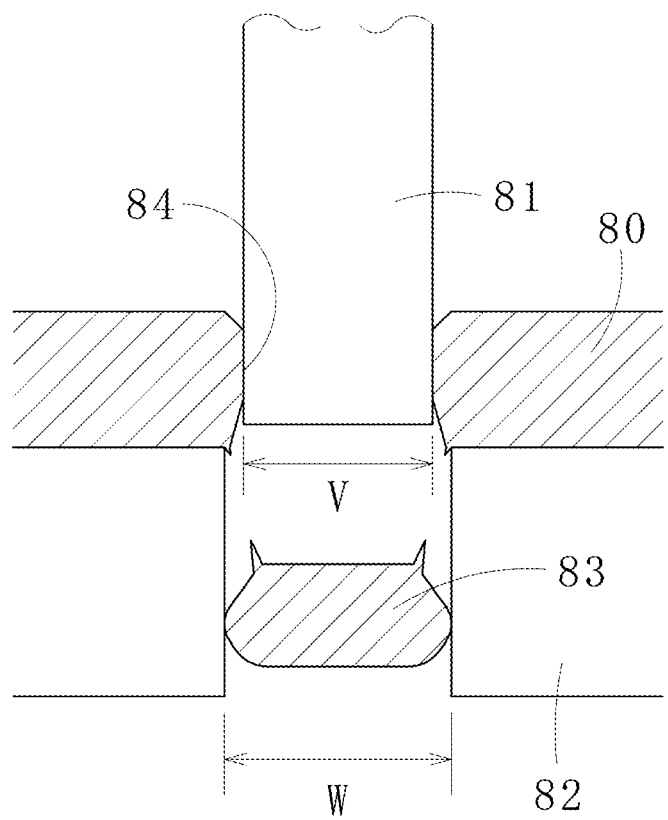
FIG. 7 is an explanatory diagram showing a functional effect of the method of manufacturing the laminated core.

As shown in FIG. 6, in this embodiment, the laminated core body includes an inner space 70 communicating to the magnet insertion holes 13, 14 located in both sides thereof via openings 68, 69, respectively. The inner space 70 includes a blocking member 71 blocking the openings 68, 69.

Each blocking member piece 71a forming the blocking member 71 includes stopper pieces 72, 73 and shrink portions (elastic portions) 76, 77 arranged horizontally (along a circumferential direction of a laminated core) and vertical pieces 74, 75 (an example of other parts) being perpendicular to the stopper pieces 72, 73 and the shrink portions 76, 77 (provided along a radial direction of a laminated core). The blocking member piece 71a has a cross-shape in plain view. The stopper pieces 72, 73 are provided to close the openings 68, 69, and ends of the stopper pieces 72, 73 are in contact with (adjoining to) the openings 68, 69 or the core sheet 11 around the openings 68, 69 in a way that the ends are disconnected by cutting and bending and separated. Furthermore, proximal sides of the stopper pieces 72, 73 include the shrink portions 76, 77 being bent in a zigzag manner in plain view. If leading ends of the stopper pieces 72, 73 are pressed to a shaft direction by resin injected in the openings 68, 69, the shrink portions 76, 77 elastically shrink (i.e., can be pulled back).

On the other hand, leading ends of the vertical pieces 74, 75 of the blocking member piece 71a are connected to the core sheet 11 forming the inner space 70 by shrunk neck portions (constrictions) 78, 79. Preferably, a width of the neck portion 78 or 79 is approximately one-tenth to one-half of a width of the vertical piece 74 or 75. With the neck portions 78, 79, the blocking member piece 71a is surely held in the inner space 70. Here, the neck portions 78, 79 can be replaced with V-shaped notches.

With this feature, when the magnet insertion holes 13, 14 are sealed with resin, the resin does not flow into the inner space 70. Also, after resin-sealing of the laminated core is completed, the blocking member 71 formed by laminating the blocking member pieces 71a is easily removed.

In addition, an advantage described hereinbelow is gained by separating the leading ends of the stopper pieces 72, 73 from the core sheet 11 and providing the shrink portions 76, 77 at the proximal sides of the stopper pieces 72, 73. As shown in FIG. 7, usually, when punching operations are performed to a plate material 80 using a punch 81 and a die 82, a width w of a blanked piece 83 is wider than a width v of a blanked hole 84. This increased width (w-v) is constant. Thus, when the blanked piece 83 is returned in the blanked hole 84 by cutting and bending (or by punching and pushing back in sequence), the blanked piece 83 is buckled in a thickness direction (i.e., the plate material is bent). Here, the elastic shrink portions 76, 77 provided at the proximal sides of the stopper pieces 72, 73 absorb this buckling force in the thickness direction, preventing the blocking member piece 71a from buckling with a thickness deviation. Here, "cutting and bending" mean that the plate material is cut and bent and then pushed back to be a planner state.

Figure 8:
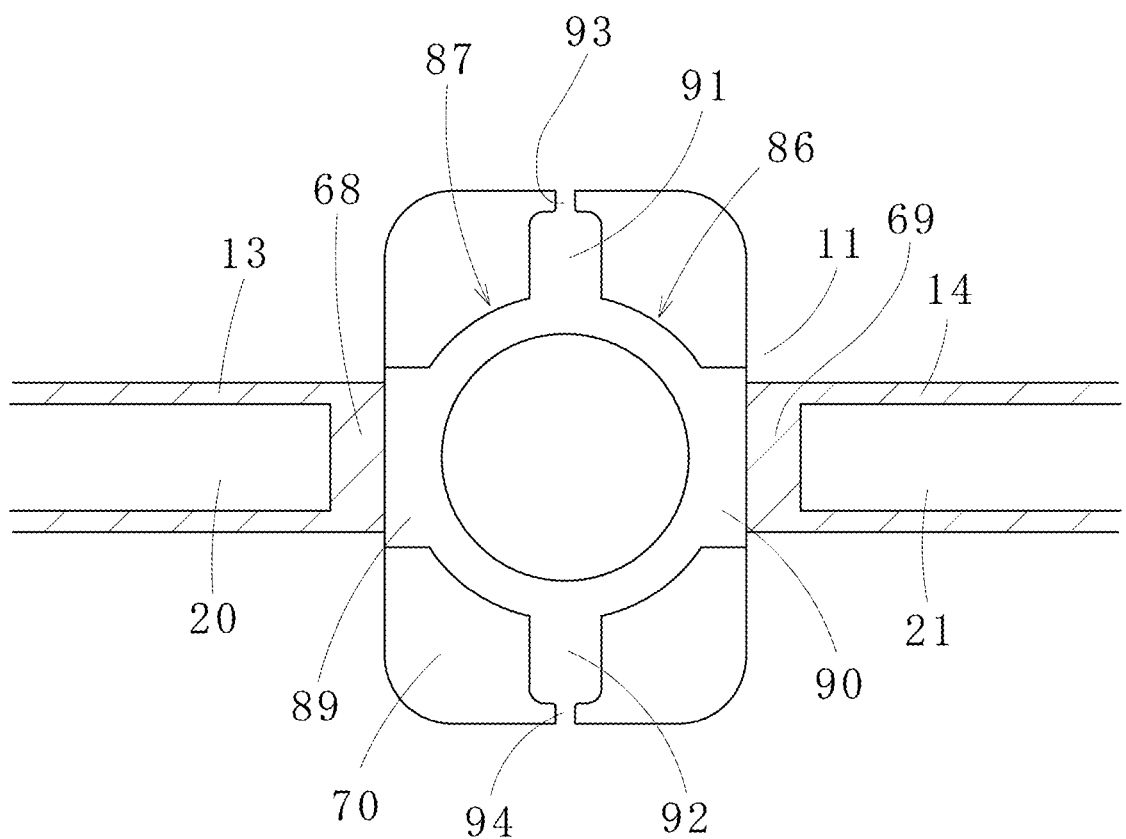
FIG. 8 is an explanatory diagram of a method of manufacturing a laminated core according to a fourth embodiment of the present invention.

Now, referring to FIG. 8, a description will be given on essential parts of a method of manufacturing a laminated core according to a fourth embodiment of the present invention.

In this embodiment, a blocking member piece 86 forming a blocking member includes a ring-shaped shrink portion 87, stopper pieces 89, 90 located in both sides of the shrink portion 87 (i.e., in a circumferential direction of a laminated core), and vertical pieces 91, 92 located in a top and a bottom of the shrink portion 87 (i.e., in a radial direction of the laminated core). The stopper pieces 89, 90 are formed by cutting and bending, and ends of the stopper pieces 89, 90 are completely separated from the core sheet 11 forming the openings 68, 69.

On the other hand, the vertical pieces 91, 92 is connected to the core sheet 11 forming the inner space 70 via neck portions (constrictions) 93, 94 each having a width narrower than the vertical piece 91 or 92. The width of the neck portion 93 or 94 is approximately one-tenth to one-half of a width of the vertical piece 91 or 92. Thus, if the ends of the stopper pieces 89, 90 are pushed by resin and further if the ends of the stopper pieces 89, 90 slightly contact the core sheet 11 by being pressed, the shrink portion 87 having a ring shape, i.e., an arc-shape in plain view, can absorb such buckling. Here, the neck portions 93, 94 can be replaced with V-shaped notches, or the V-shaped notches can be formed in the neck portions 93, 94.

Now, referring to FIG. 9, a description will be given on essential parts of a method of manufacturing a laminated core according to a fifth embodiment of the present invention.

Figure 9:
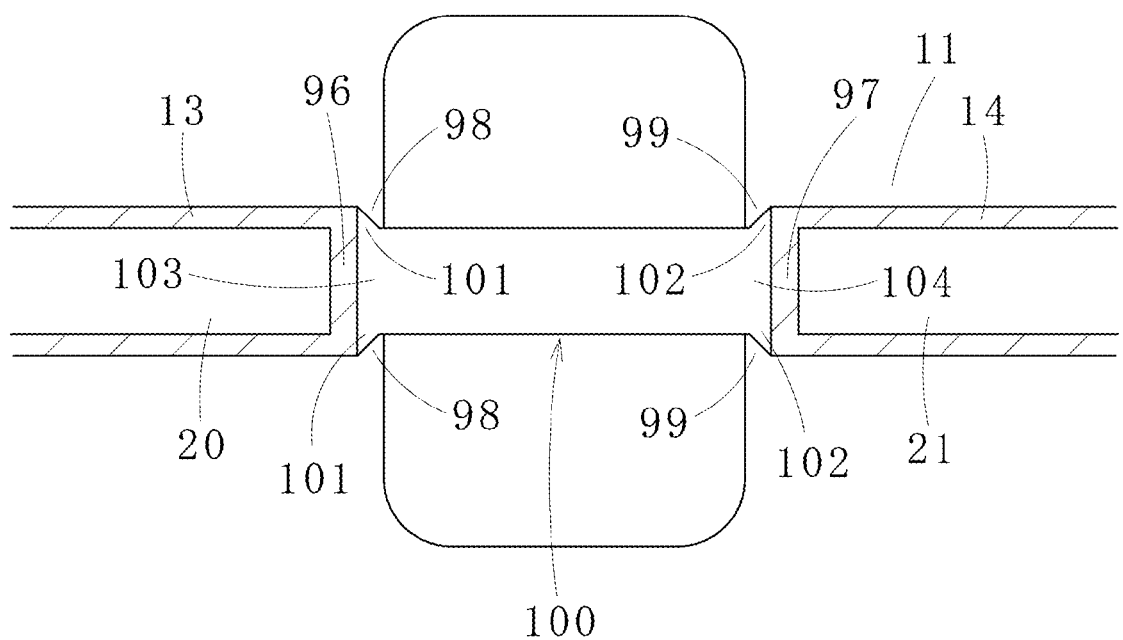
FIG. 9 is an explanatory diagram of a method of manufacturing a laminated core according to a fifth embodiment of the present invention.

As shown in FIG. 9, a pair of magnet insertion holes 13, 14 of the core sheet 11 has openings 96, 97 including inward engagement pieces 98, 99 inwardly facing to each other. The openings 96, 97 are blocked by blocking members formed by blocking member pieces 100 each having a rectangular plate shape. Both sides of the blocking member piece 100 include outward engagement pieces 101, 102 engaging with the inward engagement pieces 98, 99. Both sides of the blocking member piece 100 also include stopper pieces 103, 104 covering the outward engagement pieces 101, 102.

The inward engagement pieces 98, 99 and the outward engagement pieces 101, 102, each having a triangle shape in plain view, are completely separated by punching operations and push-back operations performed after the punching operations. In a resin-sealing process, the inward engagement pieces 98, 99 and the outward engagement pieces 101, 102 are frictionally engaged with each other. Thus, the openings 96, 97 of the magnet insertion holes 13, 14 are completely blocked by the stopper pieces 103, 104. After the laminated core 10 is finished, the blocking member (i.e., the laminated blocking member pieces 100) can be pressed in a vertical direction to be out of the laminated core 10.

Figure 10A:
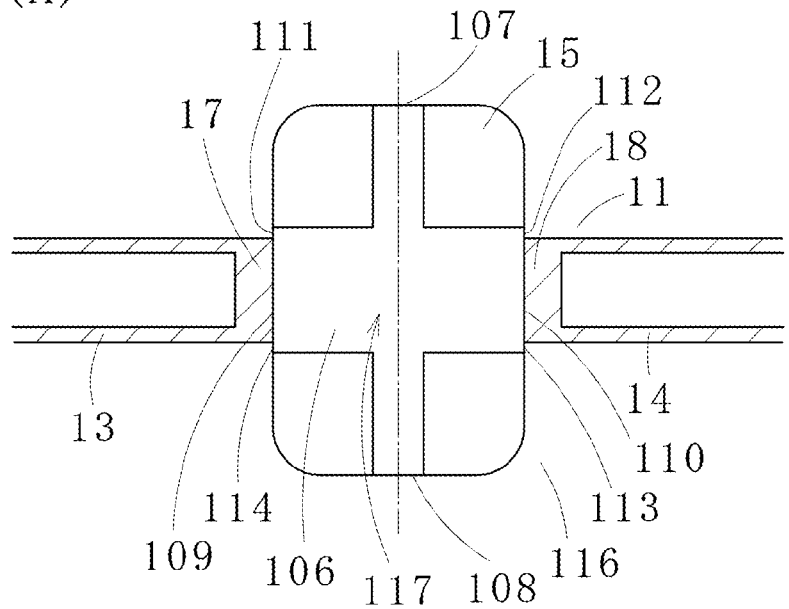
FIGS. 10(A), 10(B), and 10(C) are explanatory diagrams of a method of manufacturing a laminated core according to a sixth embodiment of the present invention, which are a plan view, a perspective view of a back side, a cross-sectional view, respectively.
Figure 10B:
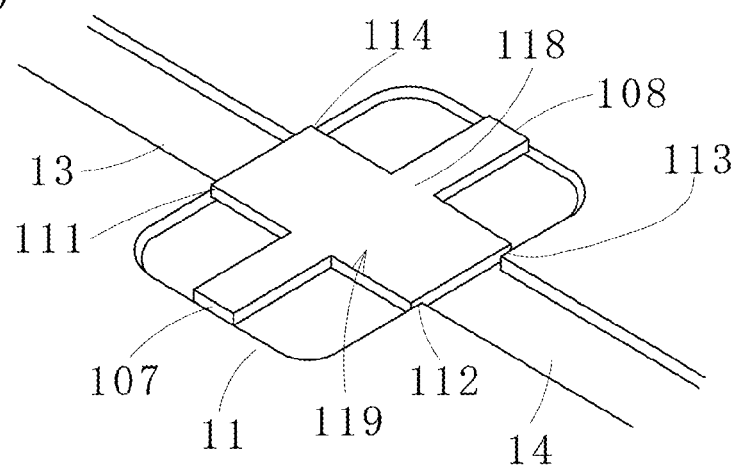

Now, referring to FIGS. 10(A) to 10(C), a description will be given on a method of manufacturing a laminated core according to a sixth embodiment of the present invention. Like the above-described embodiments, the magnet insertion holes 13, 14 include the openings 17, 18 inside thereof. The inner space 15 includes a blocking member piece 106 having a cross-shape in plain view. Also, the blocking member piece 106 has ends 107, 108 in a radial direction processed by a well-known half-punch operation using a punch and a die, so that the ends 107, 108 are connected to the core sheet 11 therearound at a level of half thickness to form a connecting portion (a temporal connecting portion). On the other hand, ends 109, 110 in a circumferential direction of the blocking member piece 106 are separated from the core sheet 11 therearound by a cutting and bending operation. In addition, the ends 109, 110 in a circumferential direction are in abutment with both sides of the openings 17, 18 in a way that the ends 109, 110 are separated. Reference numerals 111-114 indicate the abutment portions. Here, the cutting and bending operation and the half-punch operation can be performed in no particular order.

Figure 10C:
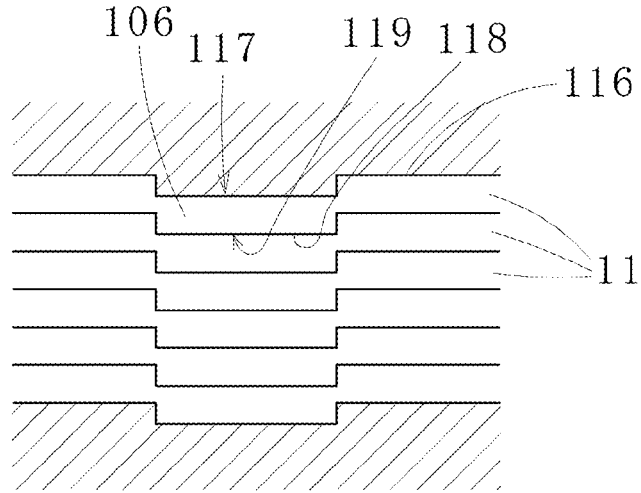

By the half-punch operation of the blocking member piece 106, as shown in FIG. 10(C), the blocking member piece 106 forms a depressed portion 117 in a surface 116 of the core sheet 11, in which the blocking member piece 106 is depressed by half the thickness. The blocking member piece 106 also forms a projecting portion 119 in the undersurface 118 of the core sheet 11, in which the blocking member piece 106 is projecting by half the thickness. By this, in the vertically-aligned core sheets 11, the depressed portion 117 and the projecting portion 119 of the blocking member piece 106 are engaged with each other to connect and interlock the vertically-aligned core sheets 11. In addition, the laminated blocking member pieces 106 work as a resin stopper and the laminated blocking member pieces 106 (i.e., the blocking member) can be blanked out after the magnet insertion holes 13, 14 are sealed with resin.

Here, the connecting portion can be a V-shaped notch or a constricted part so as to connect to the core sheet partly.

Figure 11A:
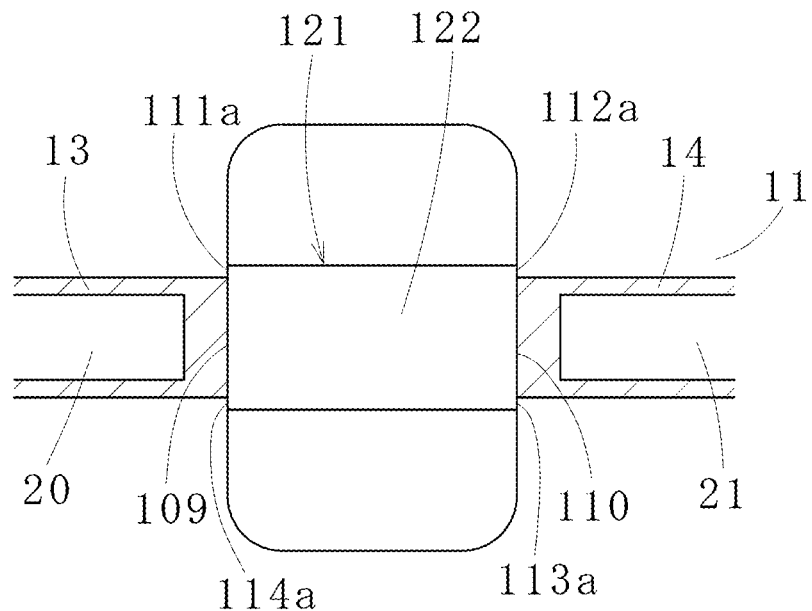
FIGS. 11(A) and 11(B) are explanatory diagrams of a method of manufacturing a laminated core according to a seventh embodiment of the present invention, which are a plan view and a perspective view of a back side, respectively.
Figure 11B:
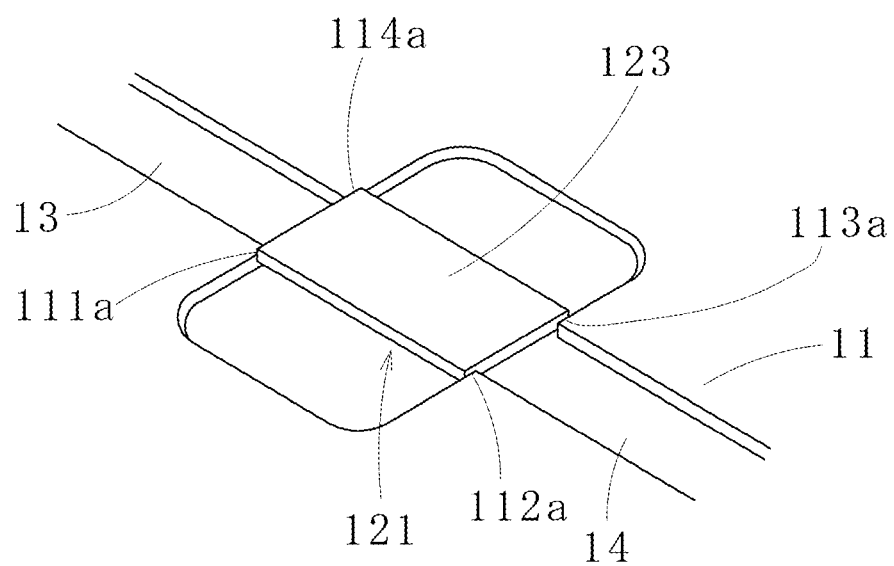

FIGS. 11(A) and 11(B) show a method of manufacturing a laminated core according to a seventh embodiment of the present invention. In this embodiment, a blocking member piece 121 has a rectangular shape in plain view. The blocking member piece 121 is formed in the core sheet 11 by half-pressing, and parts of ends 109, 110 in a circumferential direction thereof are connected to the core sheet 11 by half-pressed connecting portions 111a-114a.

Furthermore, the blocking member piece 121 includes a dent and a projection in a surface 122 and an undersurface 123, respectively. The dents and the projections of the vertically-aligned blocking member pieces 121 are engaged with each other so as to connect and interlock the vertically-aligned blocking member pieces 121.

The present invention is not limited to the above-described embodiments, but can include modifications within a scope of the present invention. For example, in the above-described embodiments, the blocking member piece is temporally connected to the core sheet therearound by forming the V-shaped notch, cutting and bending, punching and pushing back, punching, or half-punching. However, other methods for temporally connecting the blocking member piece to the core sheet therearound are also applicable as long as a layered body of the blocking member pieces (i.e., the blocking member) can be removed eventually.

In the above-described embodiments, the shape of the blocking member piece is a ring, a cross, or a rectangular, but not limited to these shapes. Also, the blocking member piece can be temporally connected to the core sheet therearound at arbitrary positions.

The laminated blocking member pieces (i.e., the blocking member) can be pressed by a pin member to be pushed out and removed after the resin-sealing of the permanent magnets.

In addition, within a scope of the present invention, the blocking member can be made by a combination of the above-described embodiments, the projecting length of the half-punched blocking member piece is preferably 0.5-0.9 times (more preferably 0.6-0.85 times) the thickness.

INDUSTRIAL APPLICABILITY

In a method of manufacturing a laminated core including magnet insertion holes partly having openings, blocking members to prevent resin from leaking at a resin-sealing process are formed by core sheets and thus it is not necessary to newly prepare blocking members. Therefore, a magnet-sealed-type laminated core can be manufactured at a low cost.

REFERENCE SIGNS LIST

10: laminated core, 10a: laminated core body, 11: core sheet, 12: shaft hole, 13, 14: magnet insertion hole, 15: inner space, 17, 18: opening, 20, 21: permanent magnet, 23: blocking member, 24, 25: dovetail groove, 26,27: projecting portion, 29, 30: lateral side in a circumferential direction, 32: blocking member piece, 33-36: through-hole, 38: punch, 39: die, 40, 41: flat punch, 43-46: joining section, 47: V-shaped notch, 49: blocking member piece, 50-53: projecting portion, 55: laminated core body, 56, 57: magnet insertion hole, 58, 59: opening, 60: outer space, 61: blocking member, 62: blocking member piece, 63: core sheet, 64: central connection, 65, 66: lateral connection, 68, 69: opening, 70: inner space, 71: blocking member, 71a: blocking member piece, 72, 73: stopper piece, 74, 75: vertical piece, 76, 77: shrink portion, 78, 79: neck portion, 80: plate material, 81: punch, 82: die, 83: blanked piece, 84: blanked hole, 86: blocking member piece, 87: shrink portion, 89, 90: stopper piece, 91, 92: vertical piece, 93, 94: neck portion, 96, 97: opening, 98, 99: inward engagement piece, 100: blocking member piece, 101, 102: outward engagement piece, 103, 104: stopper piece, 106: blocking member piece, 107, 108: end in a radial direction, 109, 110: end in a circumferential direction, 111-114: abutment portion, 111a-114a: connecting portion, 116: surface, 117: depressed portion, 118: undersurface, 119: projecting portion, 121: blocking member piece, 122: surface, 123: undersurface

The invention claimed is:
1. A method of manufacturing a laminated core, the laminated core including a laminated core body formed by laminating a plurality of core sheets, the laminated core body having magnet insertion holes with openings opening to a inner space or an external side, inserting permanent magnets in the magnet insertion holes, and resin-sealing the permanent magnets in the magnet insertion holes with the openings blocked by a blocking member, the method comprising:
- a first step of forming a blocking member piece to be the blocking member in each of the core sheets;
- a second step of assembling the core sheets, and forming the laminated core body having the magnet insertion holes of which circumferences are in a blocked state;
- a third step of resin-sealing the permanent magnets in the magnet insertion holes; and
- a fourth step of removing the blocking member, and opening some of the magnet insertion holes for improvement in magnetic characteristics of and weight saving of the laminated core.

2. The method of manufacturing a laminated core according to claim 1, wherein
a part or an entire part of circumference of the blocking member piece is frictionally held by the core sheet located around the blocking member piece.

3. The method of manufacturing a laminated core according to claim 1, wherein
a part of circumference of the blocking member piece is connected to the core sheet located around the blocking member piece by a V-notched groove.

4. The method of manufacturing a laminated core according to claim 1, wherein
a part of circumference of the blocking member piece includes an engagement projection, and the core sheet located around the blocking member piece includes an engagement recess, into which the engagement projection is fitted.

5. The method of manufacturing a laminated core according to claim 1, wherein
the blocking member pieces blocking the openings include stopper pieces each connected to the opening or the core sheet located around the opening in a way that the stopper piece is cut and bent, and the blocking member piece other than the stopper piece connected to the core sheet is connected to the core sheet by a shrunk neck portion or a V-shaped notch.

6. The method of manufacturing a laminated core according to claim 5, wherein
the blocking member piece includes an elastic portion enabling the stopper piece to elastically move backward from the opening.

7. The method of manufacturing a laminated core according to claim 6, wherein
the elastic portion is bent in a zigzag shape or an arc shape in plan view.

8. The method of manufacturing a laminated core according to claim 1, wherein
the openings include inward engagement pieces inwardly facing to each other, the blocking member piece includes the stopper pieces having outward engagement pieces to be fitted in the inward engagement pieces, and the blocking member piece is frictionally engaged with the core sheet by a punching operation and a push-back operation performed in sequence.

9. The method of manufacturing a laminated core according to claim 8, wherein
the inward engagement piece and the outward engagement piece each have a triangle shape in plan view.

10. The method of manufacturing a laminated core according to claim 1, wherein
the blocking member pieces are formed in the core sheets by a half-punching operation, and the vertically-aligned core sheets are connected by the half-punched blocking member pieces.

11. The method of manufacturing a laminated core according to claim 1, wherein
the blocking member piece includes abutment portions being in contact with the core sheet located in both sides of the openings and connecting portions to be partly connected to the core sheet with V-shaped notches, by half-punching, or with constrictions.

12. The method of manufacturing a laminated core according to claim 1, wherein
the magnet insertion holes are arranged in pairs, and each pair of the magnet insertion holes includes the openings facing to each other.

13. The method of manufacturing a laminated core according to claim 1, wherein
the blocking member pieces include interlocking portions and thereby the vertically-aligned blocking member pieces are laminated and interlocked.

14. The method of manufacturing a laminated core according to claim 1, wherein,
after the permanent magnets are resin-sealed in the magnet insertion holes, the laminated blocking member pieces are punched and removed by a punch or are pressed, pushed, and removed by a pin member.

* * * * *